US012746671B2

(12) United States Patent
Takaya

(10) Patent No.: US 12,746,671 B2
(45) Date of Patent: Sep. 29, 2026

(54) MOVEMENT ROUTE SETTING METHOD

(71) Applicant: NEC Corporation, Tokyo (JP)

(72) Inventor: Kei Takaya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 59 days.

(21) Appl. No.: 18/838,265

(22) PCT Filed: Mar. 1, 2022

(86) PCT No.: PCT/JP2022/008605
§ 371 (c)(1),
(2) Date: Aug. 14, 2024

(87) PCT Pub. No.: WO2023/166561
PCT Pub. Date: Sep. 7, 2023

(65) Prior Publication Data

US 2025/0144800 A1 May 8, 2025

(51) Int. Cl.
*B25J 9/16* (2006.01)
*B25J 9/10* (2006.01)

(52) U.S. Cl.
CPC ............... *B25J 9/1666* (2013.01); *B25J 9/10* (2013.01); *B25J 9/1671* (2013.01)

(58) Field of Classification Search
CPC ........... B25J 9/1666; B25J 9/10; B25J 9/1671
See application file for complete search history.

(56) References Cited

U.S. PATENT DOCUMENTS 8,935,096 B2 * 1/2015 Choi .................. G01C 21/3446 701/533
10,899,008 B2 * 1/2021 Sinyavskiy ......... A47L 11/4066
2009/0043440 A1 * 2/2009 Matsukawa .......... G05D 1/0214 701/25
2009/0300459 A1 * 12/2009 Fukuoka ............... H04L 1/1825 714/751
2017/0053172 A1 * 2/2017 Nakasu .................. G06V 20/53
2017/0269709 A1 * 9/2017 Yamasaki ............... G06T 7/248
2019/0179011 A1 * 6/2019 Yamada ................ G01S 13/534
2019/0361431 A1 11/2019 Choi et al.

(Continued)

FOREIGN PATENT DOCUMENTS

JP 2010-152684 A 7/2010
JP 2010-191502 A 9/2010

(Continued)

OTHER PUBLICATIONS

International Search Report for PCT Application No. PCT/JP2022/008605, mailed on May 24, 2022.

*Primary Examiner* — Sohana Tanju Khayer
(74) *Attorney, Agent, or Firm* — Sughrue Mion, PLLC

(57) ABSTRACT

A movement route setting apparatus of the present disclosure includes: a space dividing unit that divides interior of a space in which a moving object can move into regions; a motion vector setting unit that sets, for each of the regions, a motion vector that the moving object moves based on information of an object that exists in the space and obstructs movement of the moving object; and a movement route calculating unit that, when calculating a movement route for the moving object in the space so as to satisfy a preset condition, calculates the movement route based on the motion vector set for each of the regions and a distance of the region to the object.

16 Claims, 10 Drawing Sheets

(56) References Cited

U.S. PATENT DOCUMENTS

| | | | | |
|---|---|---|---|---|
| 2021/0166450 | A1* | 6/2021 | Xu | G06T 11/203 |
| 2022/0034742 | A1* | 2/2022 | Asano | G01M 3/38 |
| 2023/0306857 | A1* | 9/2023 | Hayakawa | G01C 21/20 |
| 2023/0394981 | A1* | 12/2023 | Benedek | G08G 5/59 |
| 2024/0030994 | A1* | 1/2024 | Zhao | H04W 36/322 |
| 2024/0219922 | A1* | 7/2024 | Motoyama | G08G 5/57 |

FOREIGN PATENT DOCUMENTS

| | | | |
|---|---|---|---|
| JP | 2018-185633 | A | 11/2018 |
| JP | 7004475 | B1 | 1/2022 |

* cited by examiner

MOVEMENT ROUTE SETTING METHOD

This application is a National Stage Entry of PCT/JP2022/008605 filed on Mar. 1, 2022, the contents of all of which are incorporated herein by reference, in their entirety.

TECHNICAL FIELD

The present invention relates to a movement route setting method, a movement route setting apparatus, and a program.

BACKGROUND ART

In recent years, environments in which robots work has increased, which requires appropriate setting of the movement routes of the robots. For example, Patent Literature 1 describes a method for searching for a movement route with an aim of allowing a robot to work with safety and efficiency Specifically, Patent Literature 1 describes setting grids on map information, setting vectors representing an obstacle region and a vehicle movement direction in each of the grids, and searching for a route based on the information.

CITATION LIST

Patent Literature

Patent literature 1: Japanese Unexamined Patent Application Publication No. JP-A 2010-191502

SUMMARY OF INVENTION

Technical Problem

However, according to the method of Patent Literature 1 mentioned above, the movement route of the moving object is searched for in accordance with the vectors set in advance in the grids, so that there arises a problem that the degree of freedom in the movement route to be set is low and it is difficult to set a movement route that is more optimal and safer.

Accordingly, an object of the present invention is to provide a movement route setting method that can solve the above problem that it is difficult to set a more optimal and safer movement route for a moving object.

Solution to Problem

A movement route setting method as an aspect of the present invention includes: dividing interior of a space in which a moving object can move into regions: setting, for each of the regions, a motion vector that the moving object moves based on information of an object that exists in the space and obstructs movement of the moving object; and when calculating a movement route for the moving object in the space so as to satisfy a preset condition, calculating the movement route based on the motion vector set for each of the regions and a distance of the region to the object.

Further, a movement route setting apparatus as an aspect of the present invention includes: a space dividing unit that divides interior of a space in which a moving object can move into regions: a motion vector setting unit that sets, for each of the regions, a motion vector that the moving object moves based on information of an object that exists in the space and obstructs movement of the moving object; and a movement route calculating unit that, when calculating a movement route for the moving object in the space so as to satisfy a preset condition, calculates the movement route based on the motion vector set for each of the regions and a distance of the region to the object.

Further, a computer program as an aspect of the present invention causes an information processing apparatus to execute processes to: divide interior of a space in which a moving object can move into regions; set, for each of the regions, a motion vector that the moving object moves based on information of an object that exists in the space and obstructs movement of the moving object; and when calculating a movement route for the moving object in the space so as to satisfy a preset condition, calculate the movement route based on the motion vector set for each of the regions and a distance of the region to the object.

Advantageous Effects of Invention

Configured as described above, the present invention enables setting of a more optimal and safer movement route for a moving object.

DESCRIPTION OF EXAMPLE EMBODIMENTS

First Example Embodiment

Figure 1:
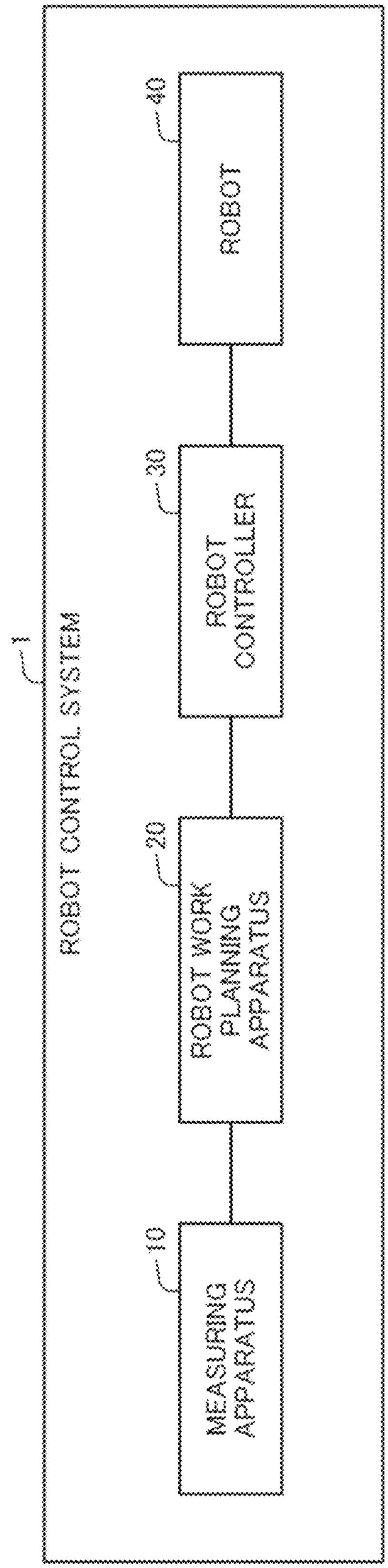
FIG. 1 is a block diagram showing the configuration of a robot control system in a first example embodiment of the present invention.
Figure 2:
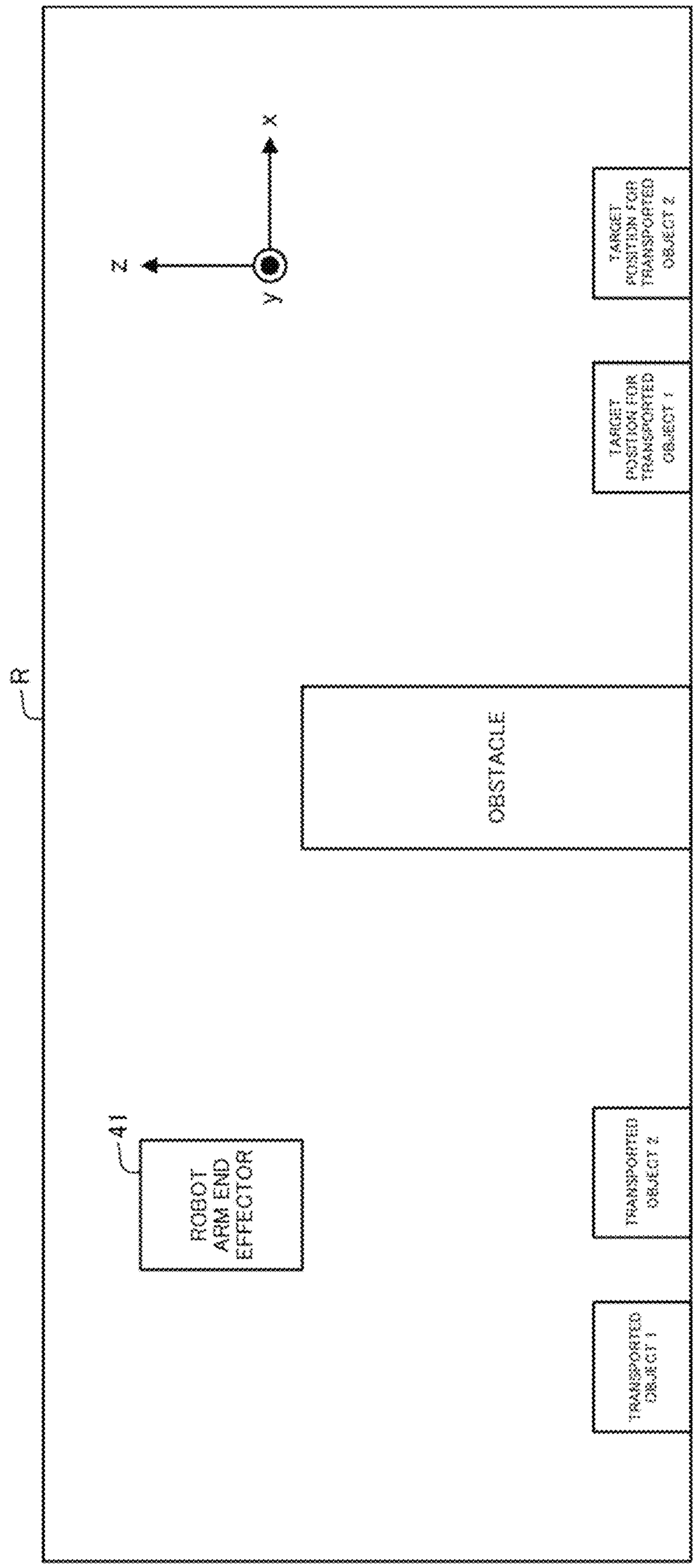
FIG. 2 is a view showing an example of a workspace for a robot disclosed in FIG. 1.

A first example embodiment of the present invention will be described with reference to FIGS. 1 to 7. FIGS. 1 and 2 are views for describing the configuration of a robot control system, and FIGS. 3 to 7 are views for describing the processing operation of the robot control system.

[Overall Configuration]

FIG. 1 shows the configuration of a robot control system 1 in the first example embodiment. The robot control system 1 mainly includes a measuring apparatus 10, a robot work planning apparatus 20, a robot controller 30, and a robot 40. As will be described below, the robot control system 1 sets a movement route for the robot 40 (a robot arm end effector 41) that is a moving object in order to safely and appropriately solve a robot work planning problem.

FIG. 2 is a view showing an example of the robot work planning problem to be solved in the robot control system 1 in the first example embodiment. Specifically, in the robot control system 1, the robot work planning apparatus 20 makes a transportation plan including setting a movement route so as to cause, in a space R shown in FIG. 2, the robot arm end effector 41 of the robot 40 to move while avoiding a collision with an obstacle that is an object impeding the movement of the robot arm end effector 41, grasp transported objects 1 and 2, and then transport the grasped transported objects 1 and 2 to join them to transported object target positions (release the grasp at the target positions).

It should be noted that there may be a plurality of transported objects as shown in FIG. 2 or there may be only one. Then, in a case where there are a plurality of transported objects, the robot work planning apparatus 20 may first make an overall plan for transportation of the plurality of transported objects and then give a plan directive to the robot controller 30, or may sequentially make plans by making a transportation plan for one transported object, giving a plan directive to the robot controller 30 to cause the robot 40 to execute the plan, and then making a transportation plan for another transported object. Moreover, the robot work planning problem that the robot control system 1 addresses is not limited to being performed in the space R as shown in FIG. 2. For example, the robot work problem is not limited to a case where an obstacle and transported objects are placed as shown in FIG. 2, and any shapes, arrangements, and numbers of obstacles and transported objects may be placed. Furthermore, the space R may be a space having any shape, and it is not limited to being three-dimensional, but may be a two-dimensional space or a one-dimensional space. The respective components will be described below.

The measuring apparatus 10 includes one or a plurality of sensors, such as a camera, a range sensor, a sonar, or a combination thereof, that detect the state of the interior of the workspace R where the robot 40 performs work. Here, in this example embodiment, what is actually measured by the measuring apparatus 10 in the space R is the position of a transported object. That is to say, since an obstacle does not move in the workspace R, there is no need to measure the position of the obstacle using the measuring apparatus 10 every time a work plan is made. Therefore, position information representing the position and shape of an obstacle can be given as a constant to the robot work planning apparatus 20 and stored in advance at the time of system design. However, there may be a case where an obstacle changes every time a robot work plan is made, and in such cases, the position of the obstacle also needs to be measured using the measuring apparatus 10. The measuring apparatus 10 provides a measurement signal thus measured to the robot work planning apparatus 20.

The measuring apparatus 10 is assumed to be a point-fixed camera in the space R of the robot work planning problem shown in FIG. 2. On the other hand, for example, in a case where there is a need to continue measuring a moving obstacle using a moving measuring apparatus, the measuring apparatus 10 may be, in order to respond to such a situation, a self-propelled or flying sensor (including a drone) that moves within a workspace. Moreover, in some problem, there may be a risk that the robot 40 applies excessive force when grasping a transported object or the like, resulting in damage to the transported object or the like. In order to address such a situation, the measuring apparatus 10 may include a sensor installed on the robot 40, a sensor installed on another object within the workspace, or the like. Furthermore, in some work planning problem, a human may enter and exit the workspace of the robot 40. In such a situation, there is a need to detect the entrance and exit of a human and prevent the robot 40 from colliding with the human. In order to address such a situation, the measuring apparatus 10 may include a sensor that detects sound inside the workspace R. As described above, the measuring apparatus 10 may include various sensors that detect a condition within the workspace R and that are installed at any places.

The robot work planning apparatus 20 generates, based on the measurement signals received from the measuring apparatus 10, the set of instructions for the respective discrete times (hereinafter referred to as a task sequence) each specifying a simple task that can be accepted by the robot 40 such as "grasp the transported object 1" or "release the grasp on the transported object 1" for each discrete time step (time step) t, and provides it to the robot controller 30 as a plan command. For example, in the robot work planning problem shown in FIG. 2, a possible plan command as a result of making a transportation plan for the transported object 1 may be a task sequence including "at discrete time step t=1, the robot arm end effector should move to position coordinates near the transported object 1", "at discrete time step t=2, the robot arm end effector should grasp the transported object 1", "at discrete time step t=3, the robot arm end effector should transport the transported object 1 to the target position of the transported object 1", and "at discrete time step t=4, the robot arm end effector should release the grasp on the transported object 1 at the target position of the transported object 1". The plan command is thus a temporal sequence of simple task instructions to be executed by the robot arm end effector 41, so that when receiving it, the robot controller 30 calculates the angle changes of the respective joints of the robot arm that are required to execute the plan command. However, the plan command may also include information about the angle changes of the respective joints of the robot arm, in which case calculations that must be performed by the robot controller 30 reduce. The detailed configuration of the robot work planning apparatus 20 will be described later.

The robot controller 30 generates input information for controlling the robot 40 based on the plan command received from the robot work planning apparatus 20 and provides it to the robot 40. For example, in this example embodiment, information included in the plan command is highly abstract information such as, at each discrete time step t, where in the three-dimensional space the end effector 41 of the robot 40 is located, which transported object among a plurality of transported objects (or may be one transported object) the end effector 41 is grasping, or whether the end effector 41 is not grasping any transported object. However, in order to actually control the robot 40, information of torque to be applied to each joint angle of the robot 40 is required as input information. Thus, the robot controller 30 calculates specific torque input information to be applied to the robot 40 that is necessary to realize an abstract state at each discrete time step t specified by the plan command, and provides it to the robot 40 as input information.

[Configuration and Operation of Robot Work Planning Apparatus]

Next, the configuration and operation of the above robot work planning apparatus 20 will be further described. Herein, the description will be made with reference to a block diagram showing the configuration of the robot work planning apparatus 20 of FIG. 3, views showing the aspect of processing by the robot work planning apparatus 20 of FIGS. 4 to 6, and a flowchart showing the operation of the robot work planning apparatus 20 of FIG. 7.

Figure 3:
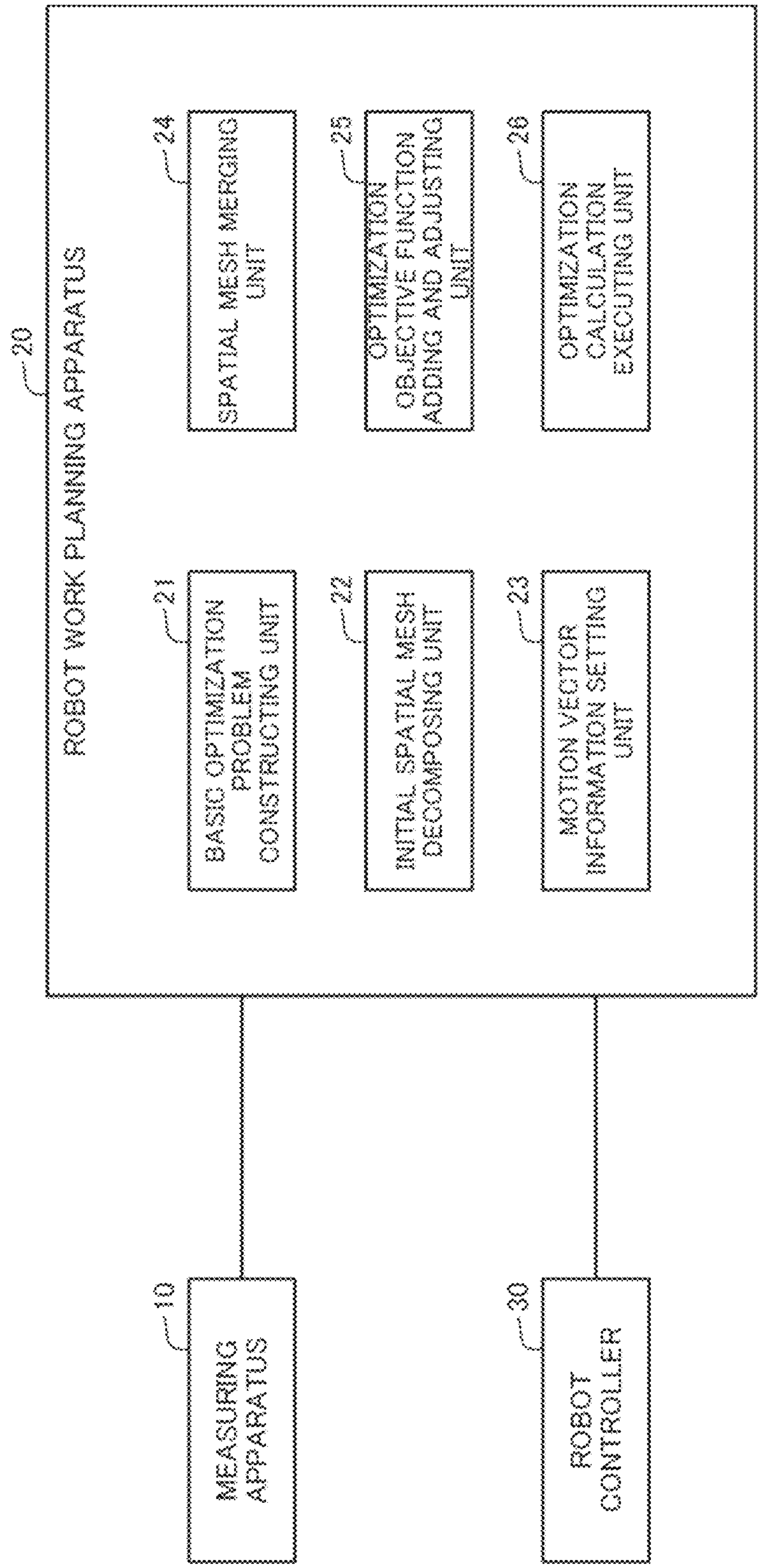
FIG. 3 is a block diagram showing the configuration of a robot work planning apparatus disclosed in FIG. 1.

The robot work planning apparatus 20 is configured with one or a plurality of information processing apparatuses including an arithmetic logic unit and a memory unit. Then, as shown in FIG. 3, the robot work planning apparatus 20 includes a basic optimization problem constructing unit 21, an initial spatial mesh decomposing unit 22, a motion vector information setting unit 23, a spatial mesh merging unit 24, an optimization objective function adding and adjusting unit 25, and an optimization calculation executing unit 26. The respective functions of the basic optimization problem constructing unit 21, the initial spatial mesh decomposing unit 22, the motion vector information setting unit 23, the spatial mesh merging unit 24, the optimization objective function adding and adjusting unit 25, and the optimization calculation executing unit 26 can be realized by the arithmetic logic unit executing a program for realizing the respective functions stored in the memory unit. The respective components will be described in detail below.

The basic optimization problem constructing unit 21 constructs a robot work plan as a basic optimization problem based on the measurement signal provided from the measuring apparatus 10. Here, a basic optimization problem needs to have two elements, a constraint C and an objective function J, so that the constraint C and the objective function J are set first (step S1). It should be noted that in the basic optimization problem, time is discretized and the discrete time step t includes a total of T steps, t=1, . . . , T.

The constraint C is the set of constraint expression representing conditions that must be satisfied by the entire system planning the motion of the robot 40. An example of the constraint expression included in this constraint C is a constraint expression of Expression 1 shown below, which represents the goal of work to be executed by the robot.

$$\|X_T^{obj1} - X_{goal}^{obj1}\| = 0, \quad \|X_T^{obj2} - X_{goal}^{obj2}\| = 0 \qquad \text{[Expression 1]}$$

Here, variables shown in Expression 2 below of Expression 1 are the three-dimensional position coordinates of two transported objects in the system at the final discrete time step t=T in the plan.

$$X_T^{obj1}, X_T^{obj2} \in \mathbb{R}^3 \qquad \text{[Expression 2]}$$

Further, variables shown in Expression 3 in Expression 1 are the respective target position coordinates of the two transported objects.

$$X_{goal}^{obj1}, X_{goal}^{obj2} \in \mathbb{R}^3 \qquad \text{[Expression 3]}$$

Further, a symbol shown in Expression 4 in Expression 1 is the L2 norm of a vector v.

$$\|v\| \qquad \text{[Expression 4]}$$

Here, a case will be considered where there is a need to appropriately set the variables shown in Expression 3 in accordance with the system environment, and so forth. For example, this may be a case of serving a transported object in a specified position on a tray arbitrarily placed by a person. At this time, the variables in Expression 3 must be appropriately set in accordance with the position and attitude of the arbitrarily placed tray. In such a case, the measurement signal provided from the measuring apparatus 10 is used by the basic optimization problem constructing unit 21. In addition, the above constraint expression is merely an example, and the number of transported objects may be one or three or more, and the above constraint expression may be rewritten using distances in a total six-dimensional space, considering the three dimensions of the Euler angle attitude of the transported object. In any case, it is necessary that, as a result of satisfaction of the above constraint, the two transported objects run the solution and finally transit to the target states.

The constraint C also includes a constraint as shown by Expression 5 on the motion space (movable range) of the robot, such as that the end effector of the robot arm must move within a determined region.

$$X_{low}^{hand} \leqq X_t^{hand} \leqq X_{upp}^{hand}, \qquad \text{[Expression 5]}$$

Here, a variable shown in Expression 6 indicates the position coordinates in the three-dimensional space of the robot arm end effector 41 at discrete time step t, and variables shown in Expression 7 indicate vectors representing the lower and upper limits of a value that each component in the three-dimensional space of Expression 6 can take.

$$X_t^{hand} \in \mathbb{R}^3 \qquad \text{[Expression 6]}$$

$$X_{low}^{hand}, X_{upp}^{hand} \in \mathbb{R}^3 \qquad \text{[Expression 7]}$$

Further, an expression including the discrete time step t will hold for all the discrete time steps t=1, . . . , T hereinafter.

Further, the constraint C also includes a constraint on the initial condition (initial position) of the transport object as shown in Expression 8.

$$X_0^{obj1} = X_{A1}^{obj1}, \quad X_0^{obj2} = X_{A1}^{obj2} \qquad \text{[Expression 8]}$$

Here, Expression 9 represents the three-dimensional position coordinates of the two transported objects at the first time in the plan. Expression 10 represents the position coordinates of the transported objects included in the measurement information provided from the measuring apparatus 10.

$$X_0^{obj1}, X_0^{obj2} \in \mathbb{R}^3 \qquad \text{[Expression 9]}$$

$$X_{A1}^{obj1}, X_{A1}^{obj2} \in \mathbb{R}^3 \qquad \text{[Expression 10]}$$

In order to make a plan to transport a transported object measured by the measuring apparatus 10 to its target position, the above constraint expression can be said to be an initial condition in a basic optimization problem. Then, at the first discrete time step t=0, by causing the robot 40 to execute a solution that starts from a position where the transported object is placed in the measurement information and satisfies a constraint representing the above target state, a movement route for transporting the measured transported object from the measurement position to the target state and timings of grasping and releasing the grasp are planned.

Further, the constraint C includes a dynamics constraint of the robot arm end effector as shown in Expression 11.

$$X_{t+1}^{hand} - X_t^{hand} = U_t^{hand} \quad \text{[Expression 11]}$$

Here, a variable shown in Expression 12 indicates the position coordinates of the robot arm end effector at the discrete time step t, as in the aforementioned constraint. A variable shown in Expression 13 indicates the input vector of the robot arm end effector at the discrete time step t.

$$X_t^{hand} \in \mathbb{R}^3 \quad \text{[Expression 12]}$$

$$U_t^{hand} \in \mathbb{R}^3 \quad \text{[Expression 13]}$$

In some example embodiment, a limit may be placed on the magnitude of an input given to the robot arm end effector 41 for safety reasons. In such a case, values that can be taken by the respective variables in Expression 13 is limited as in Expression 14 shown below.

$$U_{min}^{hand} \le U_t^{hand} \le U_{max}^{hand} \quad \text{[Expression 14]}$$

Here, variables shown in Expression 15 indicate vectors representing the minimum and maximum values of each component of the input vector that can be given to the robot arm end effector 41, respectively.

$$U_{min}^{hand}, U_{max}^{hand} \in \mathbb{R}^3 \quad \text{[Expression 15]}$$

Further, the constraint C includes a dynamics constraint for the transport object. A specific expression thereof is as shown in Expression 16 below.

$$\eta_t^{obj1}\left(v_t^{hand} - v_t^{obj1}\right) = 0, \quad \text{[Expression]}$$

$$v_t^{obj1} = \eta_t^{obj1} v_t^{hand},$$

$$v_t^{hand} = \frac{X_t^{hand} - X_{t-1}^{hand}}{\delta t},$$

$$v_t^{obj1} = \frac{X_t^{obj1} - X_{t-1}^{obj1}}{\delta t}.$$

Here, variables in Expression 17 are the same as those in the above constraints. From the definitions of these vectors and the latter two constraints above, it can be seen that variables shown in Expression 18 are velocity vectors of the robot arm end effector and the transported object at the discrete time step t.

$$X_t^{hand}, X_t^{obj1} \quad \text{[Expression 17]}$$

$$v_t^{hand}, v_t^{obj1} \in \mathbb{R}^3 \quad \text{[Expression 18]}$$

Expression 19 indicates a real number variable having a value equal to or greater than 0, and is named a switching variable.

$$\eta_t^{obj1} \in \mathbb{R} \quad \text{[Expression 19]}$$

When this switching variable is as shown in Expression 20, the first constraint in the above constraint expression holds no matter what vector Expression 18 is. On the other hand, when this switching variable is as shown in Expression 21, the first constraint in the above constraint expression requests that Expression 22 be held. Therefore, in the case of Expression 21, the transported object moves with the same velocity vector as the robot arm end effector. That is to say, it can be said that Expression 23 that is a switching variable represents whether or not the robot arm end effector is grasping the transported object.

$$\eta_t^{obj1} = 0 \quad \text{[Expression 20]}$$

$$\eta_t^{obj1} > 0 \quad \text{[Expression 21]}$$

$$v_t^{hand} - v_t^{obj1} = 0 \quad \text{[Expression 22]}$$

$$\eta_t^{obj1} \quad \text{[Expression 23]}$$

In consideration of the above, when the switching variable is Expression 20, the second constraint in the above constraint expression requests Expression 24, and when the switching variable is Expression 21, the second constraint requests Expression 25 considering together with the first constraint in the above constraint expression.

$$v_t^{obj1} = 0 \quad \text{[Expression 24]}$$

$$v_t^{obj1} = v_t^{hand} \quad \text{[Expression 25]}$$

That is to say, the above (set of) constraints request the transported object 1 to remain stationary at the discrete time step t when the robot arm end effector 41 is not grasping the transported object 1, and requests the transported object 1 to move together with the robot arm end effector 41 at the discrete time step t when the robot arm end effector 41 is grasping the transported object 1. That is to say, the above constraints represent the dynamics of the transported object.

In this example embodiment, in order to construct an optimization problem using only continuous variables, the switching variable expressed by Expression 23 is defined as a continuous variable having a value equal to or greater than 0, but may also be defined as a binary variable that can have only a value of 0 or 1. Moreover, also for the transported object 2, the same variable definitions and constraints as shown above are constructed. A parameter representing a discrete time interval will be explained in detail in a specific example of the objective function J below.

Further, the constraint C includes a constraint representing a graspable region using a switching variable. Such a constraint is specifically expressed, for example, as in the following Expression 26.

$$\eta_t^{obj1}\left(\left\|X_t^{hand} - X_t^{obj1}\right\| - r^{grasp}\right) \le 0, \quad \text{[Expression 26]}$$

Here, the variables shown in Expressions 17 and 19 are the same as those in the above constraint. Moreover, a variable shown in Expression 27 is a parameter having a positive value representing the size of the graspable region, and the user sets a desired value.

$$r^{grasp} \in \mathbb{R}_+ \quad \text{[Expression 27]}$$

Here, as described above, at the discrete time step t where Expression 21 holds, the transported object 1 is grasped by the robot arm end effector 41. However, looking at the above constraint, it can be understood that Expression 20 is requested to hold when Expression 28 holds, that is, at the discrete time step t when the distance between the robot arm end effector 41 and the transported object 1 does not exist in a region within Expression 27. Here, the switching variable is expressed by Expression 28 due to its domain.

$$\eta_t^{obj1} \geq 0 \quad \text{[Expression 28]}$$

On the other hand, when Expression 29 holds, that is, at the discrete time step t when the distance between the robot arm end effector and the transported object 1 exists in the region within Expression 27, it can be understood that the switching variable can take the value of either Expression 20 or Expression 21. Therefore, by calculating a solution that satisfies the above constraints and causing the robot 40 to execute it, the robot arm end effector can get close enough to and grasp the transported object 1. Moreover, the same constraints are also constructed for the transported object 2.

$$\| X_t^{hand} - X_t^{obj1} \| - r^{grasp} \leq 0 \quad \text{[Expression 29]}$$

Further, the constraint C includes a dynamics constraint for the transported object. This constraint is expressed as in Expression 30.

$$\| X_t^{hand} - X^{obs} \| \geq r \quad \text{[Expression 30]}$$

Here, a variable shown in Expression 31 is the same as that in the above constraint, and indicates the position coordinates of the robot arm end effector 41 at the discrete time step t. A variable shown in Expression 32 indicates the position coordinates of the center of the obstacle, and a variable shown in Expression 33 indicates the radius of the obstacle approximated by a three-dimensional sphere. Considering the above constraints, the robot arm end effector 41 is requested to be located at a position other than the interior of the obstacle at all times.

$$X_t^{hand} \in \mathbb{R}^3 \quad \text{[Expression 31]}$$

$$X^{obs} \in \mathbb{R}^3 \quad \text{[Expression 32]}$$

$$r \in \mathbb{R}_+ \quad \text{[Expression 33]}$$

Next, a specific example of the objective function J will be described. Regarding the objective function J, for example, in order to minimize the route length of the movement route of the end effector of the robot, it is conceivable to set the route length as a minimization objective function. As a specific example of a mathematical expression of the route length, Expression 34 shown below can be conceived.

$$J_t^{route} = \frac{\| X_{t+1}^{hand} - X_t^{hand} \|}{\delta t} \quad \text{[Expression 34]}$$

Here, a variable shown in Expression 35 indicates the position coordinates in the three-dimensional space of the robot arm end effector 41 at the discrete time step t, and δt indicates a discrete time interval. That is to say, it is a quantity that represents how many seconds in the real world the time interval between the discrete time steps t and t+1 corresponds to. As the discrete time interval δt is set to be smaller, a solution which is more precise in terms of time can be expected as an obtained solution, but it is general that the calculation time increases. Therefore, there is a need to set appropriate δt manually or by an automatic method using a computer in accordance with the desired solution time precision and the desired calculation time.

$$X_t^{hand} \in \mathbb{R}^3 \quad \text{[Expression 35]}$$

Here, an automatic δt setting method using a computer is, for example, as follows. First, a plurality of δt are prepared. This can be achieved by preparing, for example, an arithmetic progression such as $\delta t_1=0.1$, $\delta t_1=0.2$, . . . , $\delta t_{10}=1.0$. One example is a technique like grid search in which optimization calculation is performed using the respective δt, and from among them, δt that a solution can be found within a desired calculation time are extracted, and the smallest δt among them is determined to be appropriate δt. The symbol shown in Expression 4 in Expression 34, which is the objective function J, is the L2 norm of the vector v. Moreover, since Expression 36 in Expression 34 described above is the route length objective function at the discrete time step t, the sum of Expressions 36 for all the discrete time steps t of the plan target, that is, Expression 37 becomes the overall objective function J of the current robot motion plan.

$$J_t^{route} \quad \text{[Expression 36]}$$

$$J = \sum_{t=0}^{T} J_t^{route} \quad \text{[Expression 37]}$$

The objective function J given herein is merely an example, and other objective functions may be defined in other example embodiments or, even in this example embodiment, when the contents to be emphasized in the plan or prerequisites are different. For example, also in this example embodiment, the time sum (Expression 39) of the magnitudes of the input vectors (Expression 38) given to the robot arm end effector 41 may be used as the objective function instead of the above Expression 37.

$$\| U_t^{hand} \| \quad \text{[Expression 38]}$$

$$J = \sum_{t=0}^{T} \| U_t^{hand} \| \quad \text{[Expression 39]}$$

Thus, the basic optimization problem constructing unit 21 sets the constraint C and the objective function J as described above, and provides them to the optimization objective function adding and adjusting unit 25.

The initial spatial mesh decomposing unit 22 (space dividing unit) divides the robot workspace R to a mesh-like shape, namely, into a plurality of regions, based on the known system environment and the measurement signal provided from the measuring apparatus 10 as described above (step S2), and provides information G1, G2, . . . , Gn on grids, which are the respective regions composing the generated mesh, to the motion vector information setting unit 23. Here, specific examples of functions executed by the initial spatial mesh decomposing unit 22 will be described using two cases.

Figure 4:
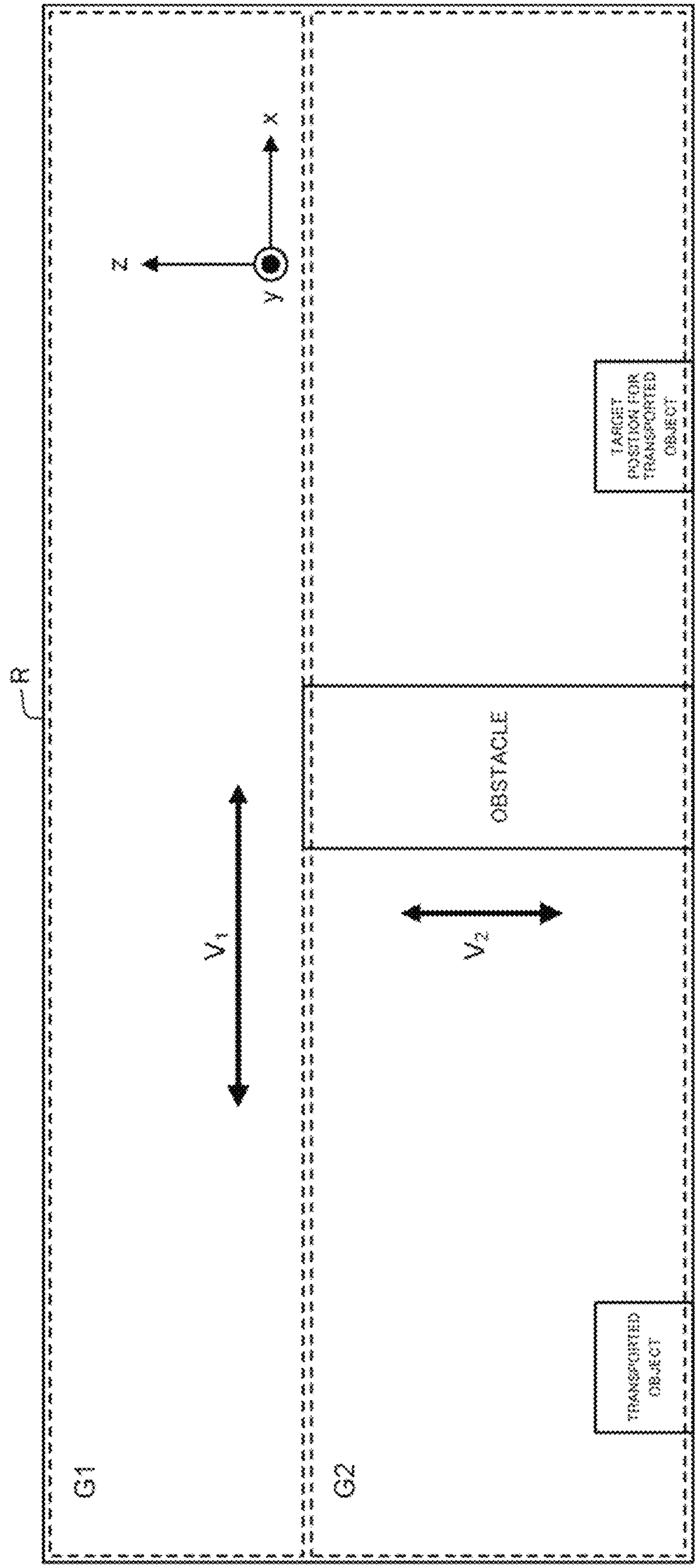
FIG. 4 is a view showing the aspect of processing by the robot work planning apparatus disclosed in FIG. 1.

First, a first specific technique will be described with reference to FIG. 4. First, a problem assumed in FIG. 4 is a problem of grasping a transported object placed on the left side of an obstacle located in the center of FIG. 4 with the robot arm end effector 41, transporting it while avoiding a collision with the wall of the obstacle, placing the transported object at a predetermined position on the right side of the wall of the obstacle, and then releasing the grasp. Although FIG. 4 shows only one transported object and the transported object is transported from the left side to the right side of the wall, transportation plans for a plurality of transported objects may be implemented simultaneously. Moreover, some of the transported objects may be transported from the right side to the left side of the obstacle, and the following explanation can be applied to such a case as well.

In the case of such a transportation problem, the following can be considered with respect to a boundary surface where the desired motion vector information of the robot arm end effector 41 of the robot 40 described above changes discontinuously. When the robot arm end effector 41 is located at a position lower than the height of the wall of the obstacle from the floor, the robot arm end effector 41 can avoid colliding with the wall of the obstacle by moving vertically relative to the floor as much as possible. Moreover, when the robot arm end effector 41 is located at a position higher than the height of the wall from the floor, the robot arm end effector 41 moves horizontally relative to the floor as much as possible, thereby enabling the object to be safely transported from the left side to the right side of the wall while avoiding a collision with the wall that is an obstacle. That is to say, it can be seen that the boundary surface where the desired motion vector information of the robot descried above changes discontinuously is a horizontal plane in space where the height from the floor is equal to the height of the obstacle. Therefore, in the case of this problem, in the spatial mesh decomposition by the initial spatial mesh decomposing unit 22, the three-dimensional workspace of the robot arm is divided into two grids, a region G1 where the height from the floor is higher than the height of the wall and a region G2 where the height from the floor is lower than the height of the wall. Then, the grid information G1 and G2 provided from the initial spatial mesh decomposing unit 22 to the motion vector information setting unit 23 are the lower and upper limit values in the three-dimensional axes x, y, and z of the respective grids as shown in the following Expression 40 specifically.

$$G_1 = \left\{x_{min}^{G_1}, x_{max}^{G_1}, y_{min}^{G_1}, y_{max}^{G_1}, z_{min}^{G_1}, z_{max}^{G_1}\right\}, \quad \text{[Expression 40]}$$

$$G_2 = \left\{x_{min}^{G_2}, x_{max}^{G_2}, y_{min}^{G_2}, y_{max}^{G_2}, z_{min}^{G_2}, z_{max}^{G_2}\right\}$$

In the case of the above example, the lower and upper limits in the x, y, and z directions of the robot movable region are substituted for the respective values of the respective grid information, resulting in Expression 41, where h indicates the height of the obstacle wall. In this example, as described above, both G1 and G2 are rectangular regions, but the shape of the grids generated by the initial spatial mesh decomposing unit 22 does not necessarily need to be rectangular, but can be spherical or elliptical, because there is no problem as long as there is no overlap between the grids. In any case, the robot movable region is separated into a plurality of grids (or a single grid) using some mathematical expression.

$$z_{min}^{G_1} = z_{max}^{G_2} = h \quad \text{[Expression 41]}$$

In the mesh decomposition method as shown in FIG. 4, by mathematizing the mesh setting rule as described above or modeling it through machine learning, it is possible to cause the initial spatial mesh decomposing unit 22 to automatically divide the space R to a mesh.

Figure 5:
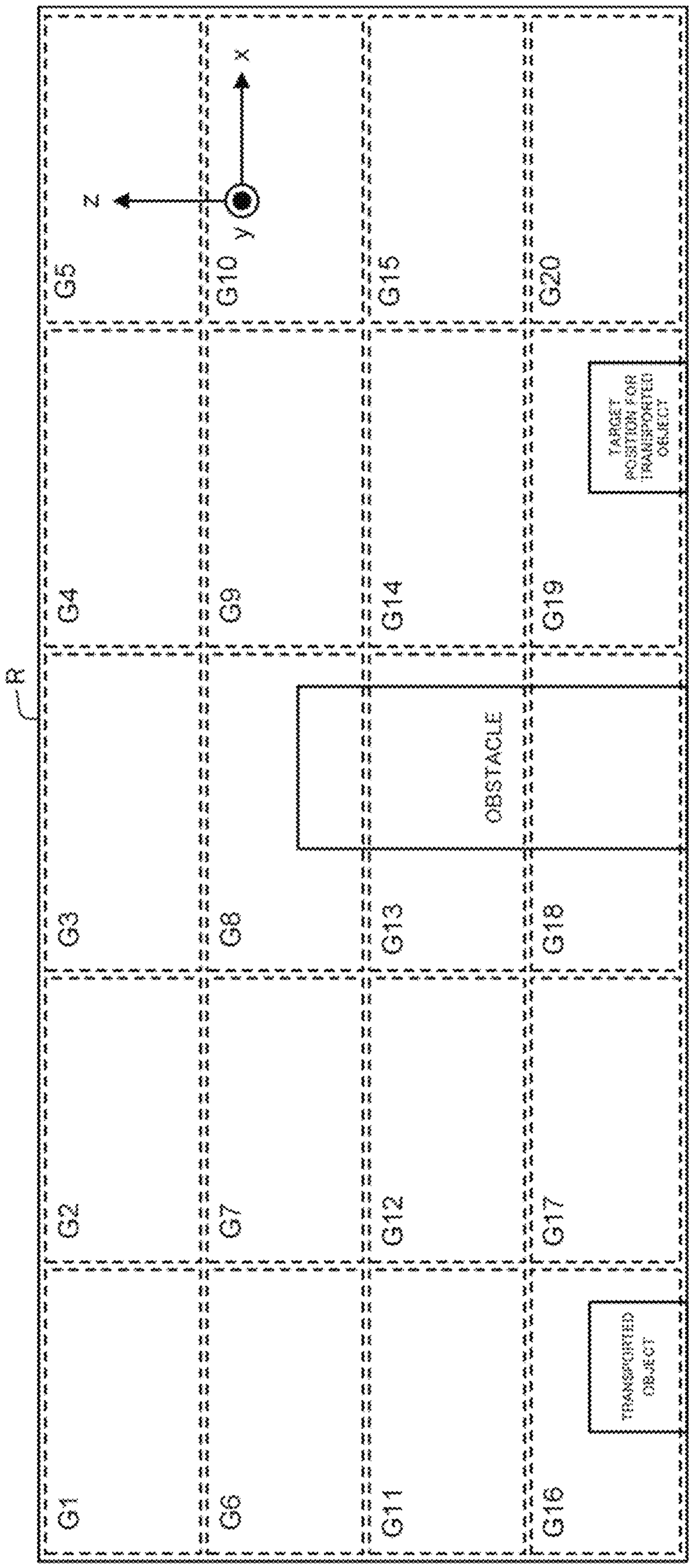
FIG. 5 is a view showing the aspect of processing by the robot work planning apparatus disclosed in FIG. 1.

Next, another example of automatic division in the same problem assumed in FIG. 4 will be explained. In this example, the initial spatial mesh decomposing unit 22 performs mesh decomposition including grids G1, G2, . . . . G20, which are the smallest possible regions, as shown in FIG. 5, through computer machine learning or the like. The reason for using the smallest possible grids herein is that when the grid is too large, a motion vector field with low precision is generated when grid merging is performed by the spatial mesh merging unit 24 to be described later. A motion vector field with low precision herein refers to, for example, a motion vector field in which a collision with an obstacle cannot be avoided even if the robot arm moves according to the motion vector field. For this reason, in the case of a problem having a complex arrangement of obstacles, and the like, it is advisable to perform mesh decomposition including the grids G1, G2, . . . . G20, which are the smallest possible regions, as shown in FIG. 5 in this example.

Then, the initial spatial mesh decomposing unit 22 provides information G1, G2, . . . . Gn on the respective grids (regions) composing the mesh generated in the above manner to the motion vector information setting unit 23.

The motion vector information setting unit 23 (motion vector setting unit) sets appropriate robot motion vector information V1, V2, . . . , Vn on the respective grids G1, G2, . . . , Gn provided from the initial spatial mesh decomposing unit 22 in a form corresponding to each grid (step S3). Then, the motion vector information setting unit 23 provides the grids G1, G2, . . . , Gn and the motion vector information V1, V2, . . . , Vn corresponding to the respective grids to the spatial mesh merging unit 24 and the optimization objective function adding and adjusting unit 25. Each of the motion vector information V1, V2, . . . , Vn includes three elements as set forth below.

The motion vector information V1 has any vector $v_1$ as the first element. The dimension of this vector may be changed in accordance with a problem. Since the problem shown in FIG. 4 taken up here is a robot motion planning problem in three-dimensional space, it is natural to set this vector $v_1$ as a three-dimensional vector.

The motion vector information V1 has type as the second element. This is either inner or cross. In accordance with whether to select inner or cross as type, formulation when adding a motion vector field potential to an objective function later changes, which will be discussed later.

The motion vector information V1 has order as the third element. Order is set to 1, 2, or none. In accordance with the setting of order, formulation of a motion vector field potential also later changes, which will be discussed later.

Here, an example of setting a motion vector by the motion vector information setting unit 23 will be explained. In this example, motion vector information that teaches a desired robot motion direction is set on each grid G1, G2, . . . , Gn provided from the initial spatial mesh decomposing unit 22 in accordance with the position and shape of an obstacle in the space R. For example, two vectors V1 and V2 shown in FIG. 4 are specific motion vector information setting examples. Symbol V1 denotes the motion vector information in the region G1 over the obstacle. It can be seen that in this region G1, when the transported object passes over the obstacle, there is a need to move in the horizontal direction in the view. Thus, vector $v_1$, which is one of the elements of V1, is set to a vector whose x component is 1 and whose other components are 0, that is, $v_1=(1, 0, 0)$ is set. Moreover, inner is set as type, and 2 is set as order. Then, the motion vector information setting unit 23 generates a motion vector field potential $J_1$ as shown in Expression 42 below, which will later be added to the objective function J provided from the basic optimization problem constructing unit 21.

$$J_1\left(X^{hand}, V^{hand}\right) = -A\ \sigma\left(X^{hand}, G_1\right)\left(V^{hand} \cdot V_1\right)^2, \quad \text{[Expression 42]}$$

Here, variables shown in Expression 43 are the three-dimensional position vector and velocity vector of the robot arm end effector 41, and a variable shown in Expression 44 is a positive constant. Regarding this parameter A, since it will be adjusted later by the optimization objective function adding and adjusting unit 25 as necessary, it is sufficient to set an appropriate value here, such as A=1 for all the grids.

$$X^{hand}, V^{hand} \in \mathbb{R}^3 \quad \text{[Expression 43]}$$

$$A \in \mathbb{R}_+ \quad \text{[Expression 44]}$$

Further, Expression 45 is a function that is 1 when the robot end effector is located inside the grid G1 and is 0 otherwise. As a specific example of mathematical expression of such a function, one using a sigmoid function as shown in Expression 46 below is conceived.

$$\sigma(X^{hand}, G_1) \quad \text{[Expression 45]}$$

$$\sigma\left(X^{hand}, G_1\right) = \sigma\left(x^{hand} - x_{min}^{G_1}\right) \cdot \sigma\left(-x^{hand} + x_{max}^{G_1}\right) \cdot \quad \text{[Expression 46]}$$

-continued $$\sigma\left(y^{hand} - y_{min}^{G_1}\right) \cdot \sigma\left(-y^{hand} + y_{max}^{G_1}\right) \cdot \sigma\left(z^{hand} - z_{min}^{G_1}\right) \cdot \sigma\left(-z^{hand} + z_{max}^{G_1}\right),$$

Here, a variable shown in Expression 47 is the position vector of the robot arm end effector 41, and Expression 48 is the x component of Expression 47 (the same applies to the y and z components). As described above, variables shown in Expression 49 are the minimum and maximum values of the x, y, and z coordinates of points included in the grids G1 and G2. Moreover, the sigmoid function σ(x) is a function defined as shown in Expression 50.

$$X^{hand} \in \mathbb{R}^3 \quad \text{[Expression 47]}$$

$$x^{hand} \in \mathbb{R} \quad \text{[Expression 48]}$$

$$x_{min}^{G_1}, x_{max}^{G_1}, y_{min}^{G_1}, y_{max}^{G_1}, z_{min}^{G_1}, z_{max}^{G_1}, x_{min}^{G_2}, x_{max}^{G_2}, y_{min}^{G_2}, y_{max}^{G_2}, z_{min}^{G_2}, z_{max}^{G_2} \quad \text{[Expression 49]}$$

$$\sigma(x) = \frac{1}{1+\exp(-ax)}, \quad \text{[Expression 50]}$$

Here, a in Expression 50 is a parameter having a positive value that is appropriately set. The value of this parameter a is set to a value as large as possible to the extent that numerical calculations during optimization calculation do not diverge. This can be achieved by performing trial optimization calculation using a plurality of parameters a, as in the aforementioned method of automatically setting the discrete time interval δt, and selecting the largest value of the parameter a among the settings for the parameter a that can obtain a solution with a certain level of prevision within a desired calculation time.

Then, by adding the motion vector field potential $J_1$ constructed in the above manner to the minimization objective function, Expression 51 is maximized when the robot arm end effector 41 is located inside the grid G1. This means that at such a discrete time step t, the velocity vector (Expression 52) of the robot arm end effector 41 is directed to be a vector whose x-direction component is non-zero and whose other components are zero, that is, a velocity vector (Expression 54) as shown in Expression 53.

$$\left(V^{hand} \cdot V_1\right)^2 \quad \text{[Expression 51]}$$

$$v_t^{hand} = \frac{X_t^{hand} - X_{t-1}^{hand}}{\delta t} \quad \text{[Expression 52]}$$

$$v_t^{hand} \sim (1, 0, 0) \quad \text{[Expression 53]}$$

$$v_t^{hand} \quad \text{[Expression 54]}$$

Here, the abovementioned type and order in this setting will be explained. First, since inner is selected as type, the inner product (Expression 55) of the velocity vector of the robot arm end effector 41 and the vector $v_1$ included in V1 is calculated, and since 2 is selected as order, the square of the inner product is calculated and $J_1$ is constructed. The reason for taking the square of the inner product at this time will be explained later.

$$V^{hand} \cdot V_1 \quad \text{[Expression 55]}$$

By doing so, a motion vector field potential $J_1$ that prefers movement in the x-axis direction can be set, regardless of whether x is increasing or decreasing as long as the movement is in the x-axis direction. If the above setting of $v_1$ is kept unchanged and 1 is selected as order, $J_1$ will point to a horizontal rightward velocity vector in FIG. 4, and a horizontal leftward velocity vector will no longer be preferred. With such settings, for example, when transporting the transported object 1 to the target state, it is possible to favorably transport by following the motion vector field set in such a manner; however, after releasing the grasp on the transported object 1 in the target state, when next moving toward the graspable region for the transported object 2, the horizontal rightward velocity vector shown in FIG. 4 is required and such a moving direction is a moving direction that does not follow the motion vector field. Likewise, regarding V2, it can be seen that $v_2$ is set to a vector whose z component is 1 and whose other components are 0, that is, to $v_2$~(0, 0, 1), type is set to inner, and order is set to 2. Thus, the motion vector information setting unit 23 constructs a motion vector field in a direction that is substantially parallel to the surface of an obstacle.

The motion vector information setting unit 23 can automatically set the motion vector field potential $J_1$ by mathematizing the technique as described above or modeling it through machine learning.

Figure 6:
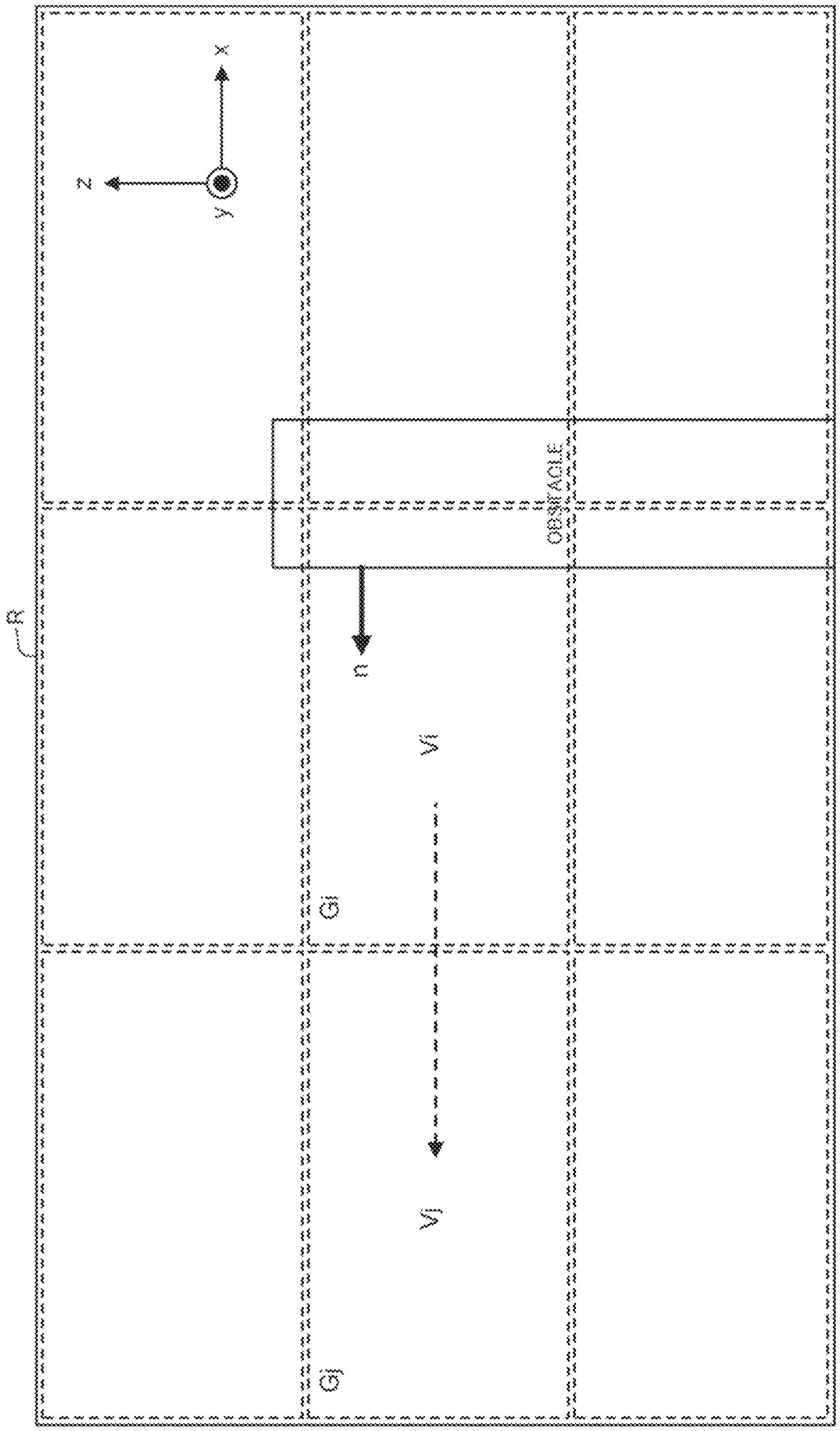
FIG. 6 is a view showing the aspect of processing by the robot work planning apparatus disclosed in FIG. 1.
Figure 7:
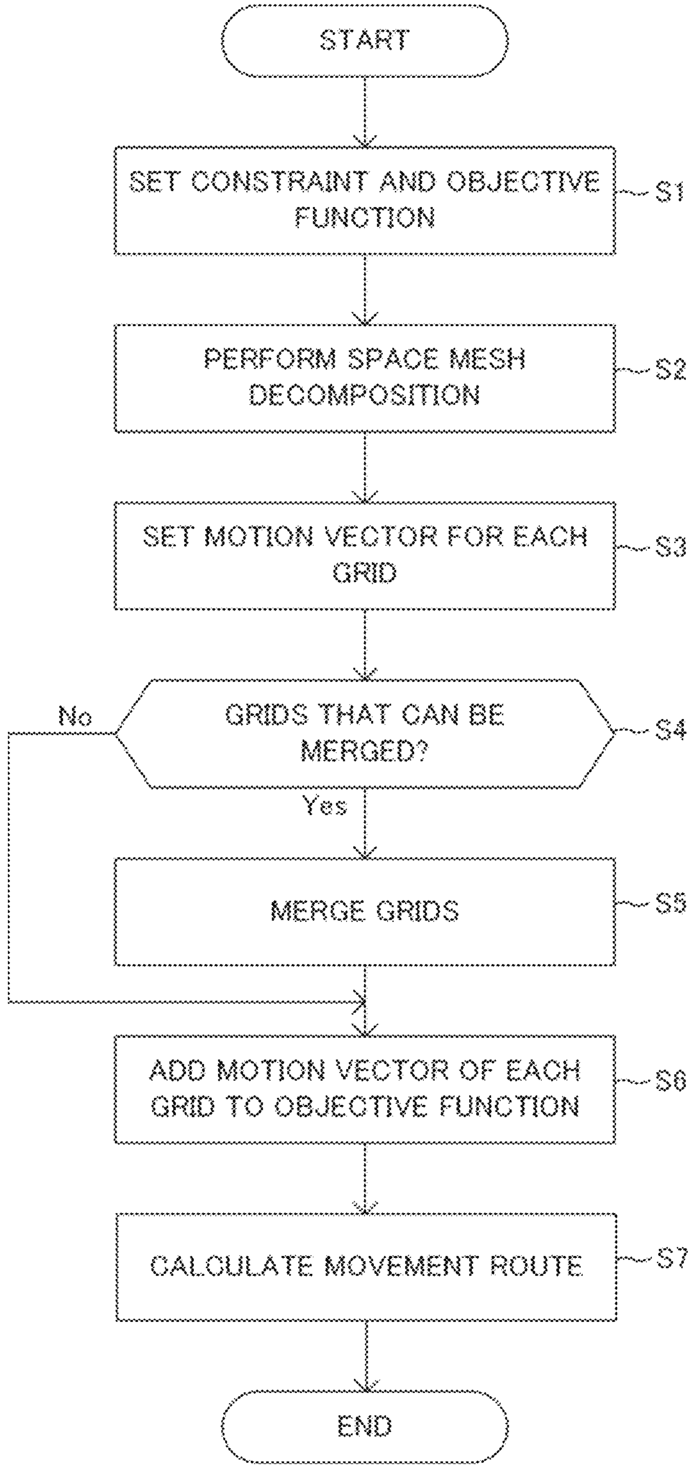
FIG. 7 is a flowchart showing the operation of the robot work planning apparatus disclosed in FIG. 1.

Next, another example of a method by which the motion vector information setting unit 23 automatically sets a motion vector from the shape and arrangement of an obstacle will be described. Here, as shown in FIG. 6, it is assumed that a rectangular obstacle is located within the space R and the space R is divided into grids. First, the surface of the obstacle that is in contact with each grid or that is located inside each grid will be considered. At this time, in a case where a plurality of obstacle surfaces are in contact with or contained within one grid, an obstacle surface with the largest contact area or contained surface area is defined as an obstacle surface corresponding to that grid. Then, as shown in FIG. 6, the normal n of an obstacle surface corresponding to each grid is obtained. By using this vector, it becomes possible to automatically set the motion vector information in the following manner.

Specifically, as shown in FIG. 6, a grid where the normal vector of an obstacle surface is obtained is denoted by Gi, and motion vector information in the grid is denoted by Vi. At this time, first, the normal vector n mentioned above is set as a vector included in Vi. Next, cross is set as type and none is set as order. By thus setting, a motion vector field potential $J_i$ shown in Expression 56 below is formed and added to the objective function J provided from the basic optimization problem constructing unit 21.

$$J_i\left(X_t^{hand}, V_t^{hand}\right) = -A \ \sigma\left(X_t^{hand}, G_i\right) \| V_t^{hand} \times n \|^2. \quad \text{[Expression 56]}$$

Here, variables shown in Expression 57 are the position vector and velocity vector of the robot arm end effector 41 at the discrete time step t, as defined in the constraint described above, A denotes a positive constant, the symbol shown in Expression 4 represents the L2 norm of the vector v, and v×u represents the cross product of the vectors v and u. The parameter A is adjusted later by the optimization objective function adding and adjusting unit 25 as necessary, so that it is sufficient here to set an appropriate value such as A=1 for all the grids. Moreover, Expression 58 is a function that is 1 when the robot arm end effector 41 is located inside the grid Gi at the discrete time step t and is 0 otherwise. A specific form of mathematical expression of such a function may be one using a sigmoid function in the same manner as described above.

$$X_t^{hand}, V_t^{hand} \in \mathbb{R}^3 \quad \text{[Expression 57]}$$

$$\sigma\left(X_t^{hand}, G_i\right) \quad \text{[Expression 58]}$$

By minimizing the potential of Expression 56 above, when the robot arm end effector 41 is located inside the grid Gi, Expression 59 is maximized. Here, from the definition of the cross product, this vector (Expression 60) is a vector that is orthogonal to the normal n of the obstacle surface. This means that the velocity vector of the robot arm end effector 41 is preferably in a direction orthogonal to the vector n. That is to say, as the direction of the velocity vector, a direction that is substantially parallel to the outer surface of the obstacle is set.

$$\| V_t^{hand} \times n \|^2 \quad \text{[Expression 59]}$$

$$V_t^{hand} \times n \quad \text{[Expression 60]}$$

Since the vector n is the normal vector of the surface of the obstacle, it can teach a movement direction (the velocity vector of the robot arm end effector 41) avoiding a collision with the obstacle to the solver that actually solves the optimization problem, by solving the optimization problem based on the motion vector field potential (Expression 56). By using such a motion vector information setting method, motion vector information can be automatically set for a grid having an obstacle surface therein.

Next, a specific example of a method for automatically setting motion vector information in a grid that does not have an obstacle surface inside will be described. A grid that has no obstacle surface inside but is adjacent to a grid with motion vector information set will be considered. For example, a grid such as Gj in FIG. 6 will be considered. For that grid, motion vector information of a grid that is adjacent to that grid and has the motion vector information is copied. However, at this time, in a case where motion vector information exists for a plurality of adjacent grids, an average value vector thereof (a vector obtained by taking the average value of the respective components) is set as the vector, and type-cross and order-none is set. This setting operation augments grids with motion vector information. Next, motion vector information is also set for a grid adjacent to the grids with motion vector information currently. By repeating this setting operation, it is possible to finally automatically set motion vector information on all the grids.

As described above, the motion vector information setting unit 23 outputs the outputs V1, V2, . . . , Vn each including any vector v and information type and order for constructing an appropriate motion vector field potential based on the vector, and provides the information together with information of each grid G1, G2, . . . , Gn provided from the initial spatial mesh decomposing unit 22 to the spatial mesh merging unit 24.

The spatial mesh merging unit 24 (motion vector setting unit) performs comparison between grids for all the vectors set by the motion vector information setting unit 23 and, when determining that there are grids that can be merged (Yes at step S4), merges the grids (step S5). Specifically, the spatial mesh merging unit 24 compares a certain grid Gi with an adjacent grid Gi and, when the difference in the direction (gradient) of the vectors included in the motion vector information is within a certain threshold value, the spatial mesh merging unit 24 considers that the vectors can be regarded as identical, and merges the adjacent grids Gi and Gj to create a new grid Gi'. At the time, a vector included in the motion vector information Vj' therein is taken to be the average value vector of the vectors of Gi and Gj. However, such a merge operation is not performed between adjacent grids having different type or order. Therefore, when merging, type and order of the motion vector information of the newly generated grid should be copied from those of the original two grids.

However, as described above, in a case where the initial spatial mesh decomposing unit 22 has already divided to a mesh-like shape composed of grids with an appropriate size, the process by the spatial mesh merging unit 24 does not need to be performed.

The newly generated (or may be completely unchanged) grids and motion vector information G1, G2, . . . , Gn, V1, V2, . . . , Vn in the above manner are provided to the optimization objective function adding and adjusting unit 25.

The optimization objective function adding and adjusting unit 25 (movement route calculating unit) reconstructs a potential that requests the robot 40 to perform a desired motion based on, in addition to the objective function J and the constraint C provided from the basic optimization problem constructing unit 21, the grids and motion vector information G1, G2, . . . . Gn, V1, V2, . . . , Vn provided from the spatial mesh merging unit 24, and constructs a new optimization problem (step S6). Here, a specific example of the mathematical expression of the motion vector field potential that requests the robot to perform a motion similar to the motion vector field is that explained for Expression 56. By adding this motion vector field potential to the objective function J constructed by the basic optimization problem constructing unit 21, a final objective function J' that takes into account the motion vector field is constructed. Thus, the objective function J' and the above constraint C are generated as a new optimization problem, and the information is provided to the optimization calculation executing unit 26.

Here, a method for setting the parameter A included in the motion vector field potential defined on each grid, explained for Expression 56, by the optimization objective function adding and adjusting unit 25 will be explained. First, as an example, at a discrete time step t where the robot arm end effector 41 is located in the vicinity of the obstacle, it is important to move the robot arm end effector 41 with a velocity vector following the above motion vector field. Thus, on a grid located near the obstacle, the weight A of the corresponding motion vector field potential is set to be great. For this reason, the optimization objective function adding and adjusting unit 25 sets a number having a sufficiently large value in terms of numerical calculation, such as $10^5$, for example.

On the other hand, the weight A of a motion vector field potential corresponding to a grid located in a region away from the obstacle is set to be small. The reason for this is that at a discrete time step t where the robot arm end effector 41 is sufficiently away from the obstacle, it is possible to calculate more natural behavior of the robot arm end effector with a velocity vector following the objective function J of the original basic optimization problem without moving along a redundant movement route, rather than moving with the velocity vector following the motion vector field described above. For this reason, the optimization objective function adding and adjusting unit 25 sets a number having a sufficiently small value in terms of numerical calculation, such as $10^{-5}$, for example.

Thus, the optimization objective function adding and adjusting unit 25 changes the weight A of the motion vector field potential set for each grid in accordance with the distance between the robot arm end effector 41 and the obstacle and, in particular, as the distance to the obstacle is closer, set the weight A of the motion vector field potential set for the grid to a higher value. Then, as a result of setting in the above manner, when the robot arm end effector 41 moves in the vicinity of the obstacle, its motion direction strongly follows a motion vector field set to avoid a collision with the obstacle, and when the robot arm end effector moves far from the obstacle, its motion direction is not particularly influenced by a motion vector field and an optimal movement route that does not involve redundant movement can be selected.

The method for setting the weight A described above can be executed by the optimization objective function adding and adjusting unit 25 by mathematizing the method as described above or modeling it through machine learning.

Next, another example of the method for setting the weight A described above by the optimization objective function adding and adjusting unit 25 will be explained. Here, for example, when the distance between the central coordinates of an i-th grid and the central coordinates of the obstacle is defined as $r_i$, a weight $A_i$ of a motion vector field potential for the i-th grid can be defined as shown by Expression 61 as follows.

$$A_i = \exp\left(-r_i/L\right) \quad \text{[Expression 61]}$$

Here, L denotes a characteristic length scale of a planning target system. For example, when the planning target system is a rectangular parallelepiped with each side being 1 m, L=1 may be set. Moreover, $r_i$ denotes the distance between the robot arm end effector 41 and an obstacle center $X^{obs}$ at a discrete time step t, defined by Expression 62.

$$r_i = \| X_t^{hand} - X^{obs} \| \quad \text{[Expression 62]}$$

The reason for setting $A_i$ in this manner is the same as for setting the weight A of the motion vector field potential in the above setting example. That is to say, in a case where the robot arm end effector 41 is located in the vicinity of the obstacle at a discrete time step t, the weight following the motion vector field becomes large. On the other hand, in a case where the robot arm end effector 41 is not located in the vicinity of the obstacle at a discrete time step t, the weight following the motion vector field becomes exponentially smaller. As a result of thus setting, when the end effector of the robot arm moves in the vicinity of the obstacle, its motion direction will strongly follow the motion vector field set to avoid a collision with the obstacle, and when the end effector of the robot arm moves far from the obstacle, its motion direction is not particularly influenced by the motion vector field, and an optimal movement route that does not involve redundant movement can be selected.

The optimization calculation executing unit 26 (movement route calculating unit) executes an optimization calculation to plan the task and motion of the robot using the objective function J' and the constraint C provided from the optimization objective function adding and adjusting unit 25 (step S7). Here, a certain actual time threshold value $T_{cal}$ [seconds] is set, and when a feasible solution is obtained within this threshold value $T_{cal}$ [seconds], the solution is provided to the robot controller 30. On the other hand, when a feasible solution is not obtained within this threshold value $T_{cal}$ [seconds], it is considered that the setting of the weight $A_i$ of the motion vector field for each grid is inappropriate, so that the process returns to the optimization objective function adding and adjusting unit 25 and the magnitude of $A_i$ is adjusted. Here, the readjustment of the magnitude of $A_i$ may be performed manually by a human based on the idea explained above, or may be automatically adjusted through machine learning by a computer. In either case, this adjustment is performed until a feasible solution is obtained within the threshold value T [seconds] by the optimization calculation executing unit 26.

Although a method that the motion vector information setting unit 23 generates motion vector information and also generates a potential corresponding to each grid and the optimization objective function adding and adjusting unit 25 adds it to the objective function J has been described above, the motion vector information setting unit 23 may also directly add the same potential to the objective function J.

Second Example Embodiment

Figure 8:
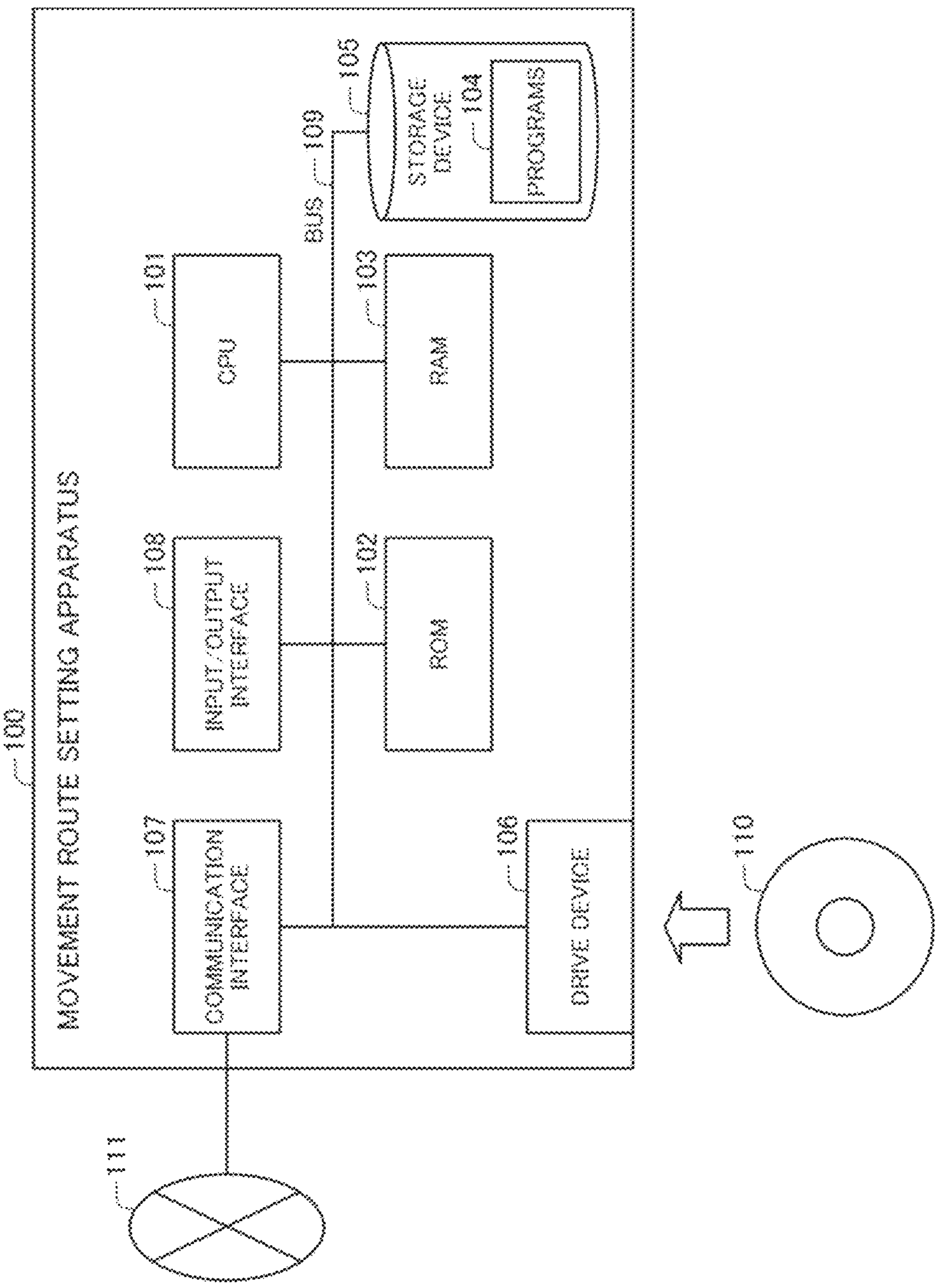
FIG. 8 is a block diagram showing the hardware configuration of a route setting apparatus in a second example embodiment of the present invention.
Figure 9:
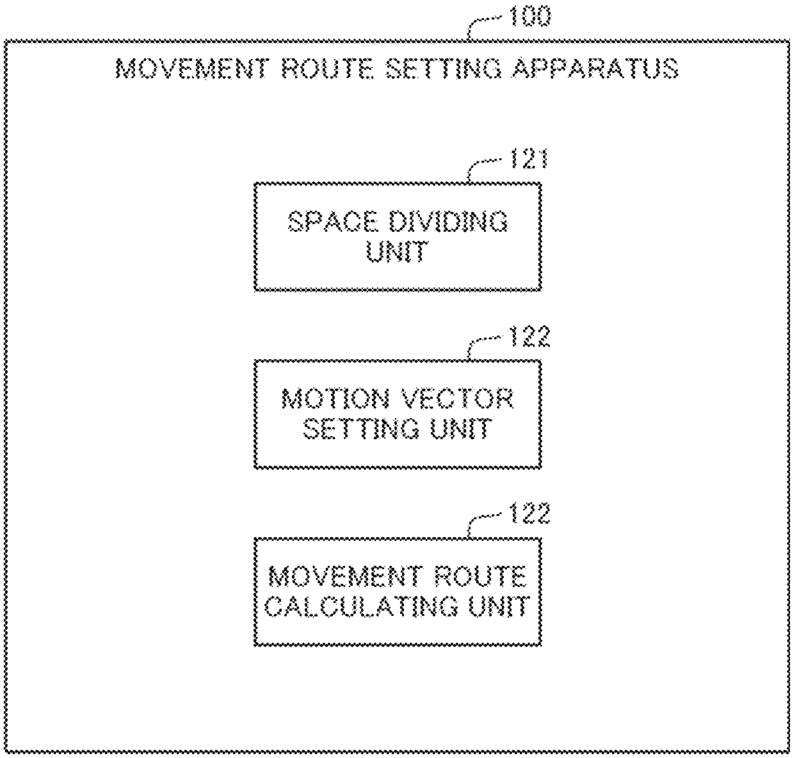
FIG. 9 is a block diagram showing the configuration of the route setting apparatus in the second example embodiment of the present invention.
Figure 10:
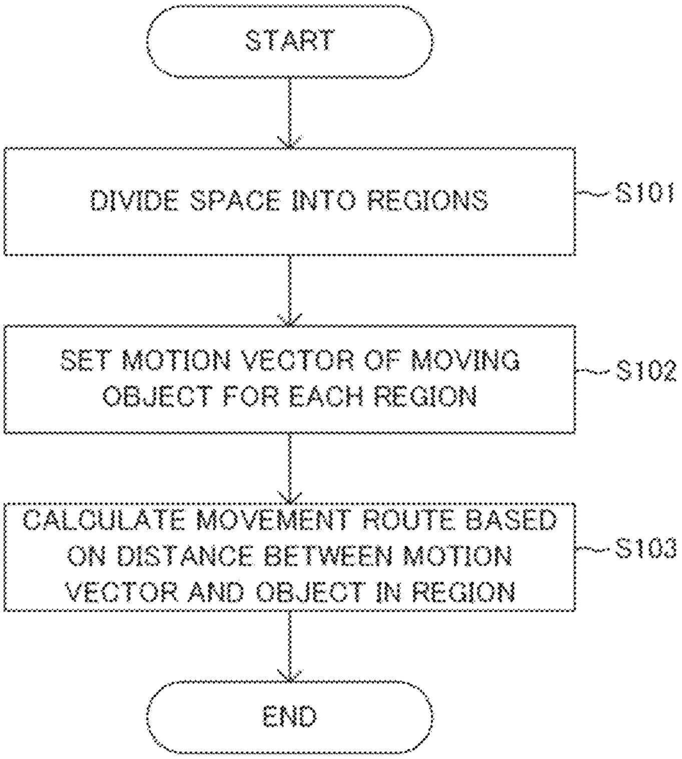
FIG. 10 is a flowchart showing the operation of the route setting apparatus in the second example embodiment of the present invention.

Next, a second example embodiment of the present disclosure will be described with reference to FIGS. 8 to 10. FIGS. 8 and 9 are block diagrams showing the configuration of a movement route setting apparatus in the second example embodiment, and FIG. 10 is a flowchart showing the operation of the movement route setting apparatus. In this example embodiment, the overview of the configurations of the movement route setting apparatus and the movement route setting method described in the above example embodiment is shown.

First, the hardware configuration of a movement route setting apparatus 100 in this example embodiment will be described with reference to FIG. 8. The movement route setting apparatus 100 is configured with a general information processing apparatus and, as an example, has the following hardware configuration including;

- a CPU (Central Processing Unit) 101 (arithmetic logic unit),
- a ROM (Read Only Memory) 102 (memory unit),
- a RAM (Random Access Memory 103 (memory unit),
- programs 104 loaded to the RAM 103,
- a storage device 105 storing the programs 104,
- a drive device 106 reading from and writing into a storage medium 110 outside the information processing apparatus,
- a communication interface 107 connected to a communication network 111 outside the information processing apparatus,
- an input/output interface 108 performing input and output of data, and
- a bus 109 connecting the respective components.

Then, by acquisition and execution of the programs 104 by the CPU 101, the movement route setting apparatus 100 can construct and include a space dividing unit 121, a motion vector setting unit 122, and a movement route calculating unit 123 shown in FIG. 9. The programs 104 are, for example, stored in advance in the storage device 105 or the ROM 102, and are loaded to the RAM 103 and executed by the CPU 101 as necessary. Moreover, the programs 104 may be provided to the CPU 101 via the communication network 111, or may be stored in advance in the storage medium 110 and read out by the drive device 106 and provided to the CPU 101. However, the space dividing unit 121, the motion vector setting unit 122, and the movement route calculating unit 123 described above may be constructed with a dedicated electronic circuit for implementing such means.

FIG. 8 shows an example of the hardware configuration of the information processing apparatus serving as the movement route setting apparatus 100, and the hardware configuration of the information processing apparatus is not limited to the abovementioned case. For example, the information processing apparatus may be configured with part of the above configuration, such as without the drive device 106.

Then, the movement route setting apparatus 100 executes a movement route setting method shown in the flowchart of FIG. 10 by the functions of the space dividing unit 121, the motion vector setting unit 122, and the movement route calculating unit 123 constructed by the programs as mentioned above.

As shown in FIG. 10, the movement route setting apparatus 100 executes processes to:

- divide the interior of a space where a moving object can move into regions (step S101);
- set, for each of the regions, a motion vector that the moving object moves, based on information of an object that exists in the space and obstructs movement of the moving object (step S102); and
- when calculating a movement route of the moving object in the space so as to satisfy a preset condition, calculate the movement route based on the motion vector set for each of the regions and a distance to the object of the region (step S103).

Configured as described above, the present disclosure enables setting of a movement route for a moving object that is more optimal and safer.

The above programs can be stored by various types of non-transitory computer-readable mediums and provided to a computer. Non-transitory computer-readable mediums include various types of tangible storage mediums. Examples of non-transitory computer-readable mediums include magnetic recording mediums (e.g., floppy disk, magnetic tape, hard disk drive), magneto-optical recording mediums (e.g., magneto-optical disk), CD-ROM (Read Only Memory), CD-R, CD-R/W, and semiconductor memory (e.g., mask ROM, PROM (Programmable ROM), EPROM (Erasable PROM), flash ROM, and RAM (Random Access Memory)). The programs may also be provided to the computer by various types of transitory computer-readable mediums. Examples of transitory computer-readable mediums include electrical signals, optical signals, and electromagnetic waves. The temporary computer-readable medium can provide the programs to the computer via a wired communication path, such as an electric wire or an optical fiber, or via a wireless communication path.

Although the present invention has been described above with reference to the above example embodiments and so forth, the present invention is not limited to the above example embodiments. The configuration and details of the present invention may be modified in various ways that are understandable to a person skilled in the art within the scope of the present invention. Moreover, at least one or more of the functions of the space dividing unit 121, the motion vector setting unit 122, and the movement route calculating unit 123 described above may be executed by an information processing apparatus installed and connected anywhere on the network, that is, may be executed by so-called cloud computing.

<Supplementary Notes>

The whole or part of the example embodiments disclosed above can be described as the following supplementary notes. Below, the overview of the configurations of the movement route setting method, the movement route setting apparatus, and the program according to the present invention will be described. However, the present invention is not limited to the following configurations.

(Supplementary Note 1)

A movement route setting method comprising:

dividing interior of a space in which a moving object can move into regions;

setting, for each of the regions, a motion vector that the moving object moves based on information of an object that exists in the space and obstructs movement of the moving object; and when calculating a movement route for the moving object in the space so as to satisfy a preset condition, calculating the movement route based on the motion vector set for each of the regions and a distance of the region to the object.

(Supplementary Note 2)

The movement route setting method according to Supplementary Note 1, comprising changing a weight of the motion vector set for the region in accordance with the distance of the region to the object, and calculating the movement route based on the motion vector.

(Supplementary Note 3)

The movement route setting method according to Supplementary Note 1 or 2, comprising setting a weight of the motion vector set for the region to be higher as the distance of the region to the object is closer, and calculating the movement route based on the motion vector.

(Supplementary Note 4)

The movement route setting method according to any of Supplementary Notes 1 to 3, comprising setting the motion vector of each of the regions based on a shape of the object.

(Supplementary Note 5)

The movement route setting method according to Supplementary Note 4, comprising in a case where the object is located in the region, setting the motion vector of the region in a direction substantially parallel to an outer surface of the object.

(Supplementary Note 6)

The movement route setting method according to any of Supplementary Notes 1 to 5, comprising setting the motion vector of the region based on the information of the object in a case where the object is located in the region, and setting the motion vector of the region based on the motion vector set for the other region adjacent to the region in a case where the object is not located in the region.

(Supplementary Note 7)

The movement route setting method according to any of Supplementary Notes 1 to 6, comprising merging the regions adjacent to each other into one based on the motion vectors of the respective regions adjacent to each other, and setting the motion vector of the region after the mergence based on the motion vectors of the respective regions before the mergence.

(Supplementary Note 8)

The movement route setting method according to Supplementary Note 7, comprising merging the regions adjacent to each other into one in a case where a difference in direction between the motion vectors of the respective regions adjacent to each other is within a preset range, and setting the motion vector of the region after the mergence based on the motion vectors of the respective regions before the mergence.

(Supplementary Note 9)

A movement route setting apparatus comprising:

a space dividing unit that divides interior of a space in which a moving object can move into regions;

a motion vector setting unit that sets, for each of the regions, a motion vector that the moving object moves based on information of an object that exists in the space and obstructs movement of the moving object; and a movement route calculating unit that, when calculating a movement route for the moving object in the space so as to satisfy a preset condition, calculates the movement route based on the motion vector set for each of the regions and a distance of the region to the object.

(Supplementary Note 10)

The movement route setting apparatus according to Supplementary Note 9, wherein the movement route calculating unit changes a weight of the motion vector set for the region in accordance with the distance of the region to the object, and calculates the movement route based on the motion vector.

(Supplementary Note 11)

The movement route setting apparatus according to Supplementary Note 9 or 10, wherein the movement route calculating unit sets a weight of the motion vector set for the region to be higher as the distance of the region to the object is closer, and calculates the movement route based on the motion vector.

(Supplementary Note 12)

The movement route setting apparatus according to any of Supplementary Notes 9 to 11, wherein the motion vector setting unit sets the motion vector of each of the regions based on a shape of the object.

(Supplementary Note 13)

The movement route setting apparatus according to Supplementary Note 12, wherein in a case where the object is located in the region, the motion vector setting unit sets the motion vector of the region in a direction substantially parallel to an outer surface of the object.

(Supplementary Note 14)

The movement route setting apparatus according to any of Supplementary Notes 9 to 13, wherein the motion vector setting unit sets the motion vector of the region based on the information of the object in a case where the object is located in the region, and sets the motion vector of the region based on the motion vector set for the other region adjacent to the region in a case where the object is not located in the region.

(Supplementary Note 15)

The movement route setting apparatus according to any of Supplementary Notes 9 to 13, wherein the motion vector setting unit merges the regions adjacent to each other into one based on the motion vectors of the respective regions adjacent to each other, and sets the motion vector of the region after the mergence based on the motion vectors of the respective regions before the mergence.

(Supplementary Note 16)

The movement route setting apparatus according to Supplementary Note 15, wherein the motion vector setting unit merges the regions adjacent to each other into one in a case where a difference in direction between the motion vectors of the respective regions adjacent to each other is within a preset range, and sets the motion vector of the region after the mergence based on the motion vectors of the respective regions before the mergence.

(Supplementary Note 17)

A non-transitory computer-readable storage medium storing a program for causing an information processing apparatus to execute processes to:

divide interior of a space in which a moving object can move into regions;

set, for each of the regions, a motion vector that the moving object moves based on information of an object that exists in the space and obstructs movement of the moving object; and when calculating a movement route for the moving object in the space so as to satisfy a preset condition, calculate the movement route based on the motion vector set for each of the regions and a distance of the region to the object.

REFERENCE SIGNS LIST

10 measuring apparatus
20 robot wok planning apparatus
21 basic optimization problem constructing unit
22 initial spatial mesh decomposing unit
23 motion vector information setting unit
24 spatial mesh merging unit
25 optimization objective function adding and storing unit
26 optimization calculation executing unit
30 robot controller
40 robot
41 robot arm end effector
100 movement route setting apparatus
101 CPU
102 ROM
103 RAM
104 programs
105 storage device
106 drive device
107 communication interface
108 input/output interface
109 bus
110 storage medium
111 communication network
121 space dividing unit
122 motion vector setting unit
123 movement route calculating unit

What is claimed is:

1. A movement route setting method comprising:

measuring, using a sensor, a space in which a moving object can move;

dividing an interior of the space into regions;

setting, for each of the regions, a motion vector in which the moving object moves based on information of an object that exists in the space and obstructs movement of the moving object;

when calculating a movement route for the moving object in the space so as to satisfy a preset condition, calculating the movement route based on:

the motion vector for each of the regions; and a corresponding distance from each of the regions to the object;

setting, for each of the regions, a weight of the motion vector, wherein for each of the regions, the weight increases as the corresponding distance to the object decreases;

calculating the movement route based on the motion vector for each of the regions; and controlling, by a controller, the moving object based on the movement route.

2. The movement route setting method according to claim 1, comprising changing the weight of the motion vector for each of the regions in accordance with the corresponding distance from each of the regions to the object; and calculating the movement route based on the motion vector for each of the regions.

3. The movement route setting method according to claim 1, comprising setting the motion vector for each of the regions based on a shape of the object.

4. The movement route setting method according to claim 3, comprising in a case where the object is located in a first region of the regions, setting the motion vector of the first region in a direction substantially parallel to an outer surface of the object.

5. The movement route setting method according to claim 1, comprising setting, in a case where the object is located in a first region of the regions, the motion vector of the first region based on the information of the object, and setting, in a case where the object is not located in the first region, the motion vector of the first region based on the motion vector for a second region of the regions that is adjacent to the first region.

6. The movement route setting method according to claim 1, comprising merging regions adjacent to each other into one region based on the motion vectors of the respective regions adjacent to each other, and setting the motion vector of the one region after the merging based on the motion vectors of the respective regions before the merging.

7. The movement route setting method according to claim 6, comprising merging the regions adjacent to each other into one region in a case where a difference in direction between the motion vectors of the respective regions adjacent to each other is within a preset range, and setting the motion vector of the one region after the merging based on the motion vectors of the respective regions before the merging.

8. A movement route setting apparatus comprising:

at least one memory storing processing instructions; and at least one processor configured to execute the processing instructions to:

measure, using a sensor, a space in which a moving object can move;

divide an interior of the space into regions;

set, for each of the regions, a motion vector in which the moving object moves based on information of an object that exists in the space and obstructs movement of the moving object;

when calculating a movement route for the moving object in the space so as to satisfy a preset condition, calculate the movement route based on:

the motion vector for each of the regions; and a corresponding distance from each of the regions to the object;

set, for each of the regions, a weight of the motion vector, wherein for each of the regions, the weight increases as the corresponding distance to the object decreases;

calculate the movement route based on the motion vector for each of the regions; and control, by a controller, the moving object based on the movement route.

9. The movement route setting apparatus according to claim 8, wherein the at least one processor is configured to execute the processing instructions to change the weight of the motion vector for each of the regions in accordance with the corresponding distance of from each of the regions to the object; and calculate the movement route based on the motion vector for each of the regions.

10. The movement route setting apparatus according to claim 8, wherein the at least one processor is configured to execute the processing instructions to set the motion vector for each of the regions based on a shape of the object.

11. The movement route setting apparatus according to claim 10, wherein the at least one processor is configured to execute the processing instructions to in a case where the object is located in a first region of the regions, set the motion vector of the first region in a direction substantially parallel to an outer surface of the object.

12. The movement route setting apparatus according to claim 8, wherein the at least one processor is configured to execute the processing instructions to set, in a case where the object is located in a first region of the regions, the motion vector of the first region based on the information of the object, and set, in a case where the object is not located in the first region, the motion vector of the first region based on the motion vector for a second region of the regions that is adjacent to the first region.

13. The movement route setting apparatus according to claim 8, wherein the at least one processor is configured to execute the processing instructions to merge regions adjacent to each other into one region based on the motion vectors of the respective regions adjacent to each other, and set the motion vector of the one region after the merging based on the motion vectors of the respective regions before the merging.

14. The movement route setting apparatus according to claim 13, wherein the at least one processor is configured to execute the processing instructions to merge the regions adjacent to each other into one region in a case where a difference in direction between the motion vectors of the respective regions adjacent to each other is within a preset range, and set the motion vector of the one region after the merging based on the motion vectors of the respective regions before the merging.

15. A non-transitory computer-readable storage medium storing a program for causing an information processing apparatus to execute processes to:

measure, using a sensor, a space in which a moving object can move;

divide an interior of the space into regions;

set, for each of the regions, a motion vector in which the moving object moves based on information of an object that exists in the space and obstructs movement of the moving object;

when calculating a movement route for the moving object in the space so as to satisfy a preset condition, calculate the movement route based on;

the motion vector for each of the regions; and a corresponding distance from each of the regions to the object;

set, for each of the regions, a weight of the motion vector, wherein for each of the regions, the weight increases as the corresponding distance to the object decreases;

calculate the movement route based on the motion vector for each of the regions; and control, by a controller, the moving object based on the movement route.

16. The movement route setting method according to claim 1, comprising setting a motion direction of the moving object based on the motion vector for each of the regions, and calculating the movement route.

* * * * *